US012597169B2

(12) United States Patent
Parappillil Baby et al.

(10) Patent No.: US 12,597,169 B2
(45) Date of Patent: Apr. 7, 2026

(54) ACTIVITY PREDICTION USING PORTABLE MULTISPECTRAL LASER SPECKLE IMAGER

(71) Applicant: Tata Consultancy Services Limited, Mumbai (IN)

(72) Inventors: Renju Parappillil Baby, Bangalore (IN); Parama Pal, Bangalore (IN); Beena Rai, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 343 days.

(21) Appl. No.: 18/421,030

(22) Filed: Jan. 24, 2024

(65) Prior Publication Data

US 2024/0257399 A1     Aug. 1, 2024

(30) Foreign Application Priority Data

Jan. 31, 2023    (IN) ............................. 202321006332

(51) Int. Cl.
*G06T 7/90*          (2017.01)
*G06T 5/50*          (2006.01)
          (Continued)

(52) U.S. Cl.
CPC ................. *G06T 7/90* (2017.01); *G06T 5/50* (2013.01); *G06T 7/194* (2017.01); *G06V 10/25* (2022.01);
          (Continued)

(58) Field of Classification Search
CPC .. G06T 7/90; G06T 5/50; G06T 7/194; G06T 2207/10024; G06T 2207/10036;
          (Continued)

(56) References Cited

U.S. PATENT DOCUMENTS 9,226,661 B2    1/2016  Thompson et al.
2016/0157725 A1    6/2016  Munoz
          (Continued)

FOREIGN PATENT DOCUMENTS

CN        107019490 A      8/2017
CN        110599507 B   *  4/2022   ............... G06T 7/50
EP        4 056 102 A1     9/2022

OTHER PUBLICATIONS

Singh et al., "Development of an intelligent laser biospeckle system for early detection and classification of soybean seeds infected with seed-borne fungal pathogen (Colletotrichum truncatum)," 2021, ScienceDirect, Biosystems Engineering, vol. 212, pp. 442-457. (Year: 2021).*

(Continued)

*Primary Examiner* — Emily C Terrell
*Assistant Examiner* — Julia Z. Yao
(74) *Attorney, Agent, or Firm* — Finnegan, Henderson, Farabow, Garrett & Dunner, LLP

(57)          ABSTRACT

Multispectral laser speckle analysis techniques have been widely used for applications such as the analysis of seed qualities, detection of fungal infections in fresh produce, estimation of blood flow velocities, and the like. However, the conventional methods fail to address color bias in images which is a major concern in terms of accuracy in applications like activity prediction. and the present disclosure provides a novel image processing algorithm which performs activity prediction without any color bias. Here, an RGB input image is segmented, and mask is generated. Distance based clustering is performed on the masked image to obtain cluster map. Simultaneously, color coded activity map is generated for each color component of the image. Further, the color coded activity map is multiplied with (Continued)

cluster contrast values and thereby an optimal color coded activity region is selected for activity map generation.

15 Claims, 14 Drawing Sheets

(51) Int. Cl.

| | |
|---|---|
| *G06T 7/194* | (2017.01) |
| *G06V 10/25* | (2022.01) |
| *G06V 10/56* | (2022.01) |
| *G06V 10/762* | (2022.01) |

(52) U.S. Cl.
CPC ............ *G06V 10/56* (2022.01); *G06V 10/762* (2022.01); *G06T 2207/10024* (2013.01); *G06T 2207/10036* (2013.01); *G06T 2207/20221* (2013.01)

(58) Field of Classification Search
CPC .......... G06T 2207/20221; G06V 10/25; G06V 10/56; G06V 10/762; G06V 10/143; G06V 10/145; G06V 10/26; G06V 10/28; G06V 10/60; G06V 20/52; G06V 20/68; G06F 18/23213
See application file for complete search history.

(56) References Cited

U.S. PATENT DOCUMENTS

2020/0320682 A1* 10/2020 Alexander ........ G06F 18/24155
2023/0103532 A1* 4/2023 Harrah .................. G06T 7/0012
382/110

OTHER PUBLICATIONS

Pieczywek et al., "Early detection of fungal infection of stored apple fruit with optical sensors—Comparison of biospeckle, hyperspectral imaging and chlorophyll fluorescence," 2018, ScienceDirect, Food Control 2018, vol. 85, pp. 327-338. https://doi.org/10.1016/j.foodcont.2017.10.013. (Year: 2018).*

Singh et al., "Early Detection of Seed Infection using Motion History Image based Laser Biospeckle Technique," 2020 IEEE 17th India Council International Conference (INDICON), New Delhi, India, 2020, pp. 1-5, doi: 10.1109/INDICON49873.2020.9342582. (Year: 2020).*

Li et al., "Two-wavelength image detection of early decayed oranges by coupling spectral classification with image processing," 2022, Science Direct, Journal of Food Composition and Analysis, vol. 11. https://doi.org/10.1016/j.jfca.2022.104642. (Year: 2022).*

Thakur et al., "Laser biospeckle technique for characterizing the impact of temperature and initial moisture content on seed germination," 2022, ScienceDirect, Optics and Lasers in Engineering, vol. 153. https://doi.org/10.1016/j.optlaseng.2022.106999. (Year: 2022).*

Singh et al., "Application of laser biospeckle analysis for assessment of seed priming treatments," 2020, ScienceDirect, Computers and Electronics in Agriculture, vol. 169. https://doi.org/10.1016/j.compag.2020.105212. (Year: 2020).*

Catalano et al., "Viability of biospeckle laser in mobile devices," 2019, ScienceDirect, Optik, vol. 183, pp. 897-905. https://doi.org/10.1016/j.ijleo.2019.02.055. (Year: 2019).*

Meschino et al., "Biospeckle image stack process based on artificial neural networks," 2010 Annual International Conference of the IEEE Engineering in Medicine and Biology, Buenos Aires, Argentina, 2010, pp. 4056-4059, doi: 10.1109/IEMBS.2010.5627620. (Year: 2010).*

Gao et al. CCD-Based Skinning Injury Recognition on Potato Tubers (*Solanum tuberosum* L.): A Comparison between Visible and Biospeckle Imaging. Sensors (Basel). Oct. 18, 2016;16(10):1734. doi: 10.3390/s16101734. (Year: 2016).*

Jiang et al. Study on Black Spot Disease Detection and Pathogenic Process Visualization on Winter Jujubes Using Hyperspectral Imaging System. Foods. Jan. 17, 2023;12(3):435. doi: 10.3390/foods12030435. (Year: 2023).*

Kim et al., "Multi-spectral laser speckle contrast images using a wavelength-swept laser," Journal of Biomedical Optics, 24(7) (2019).

* cited by examiner

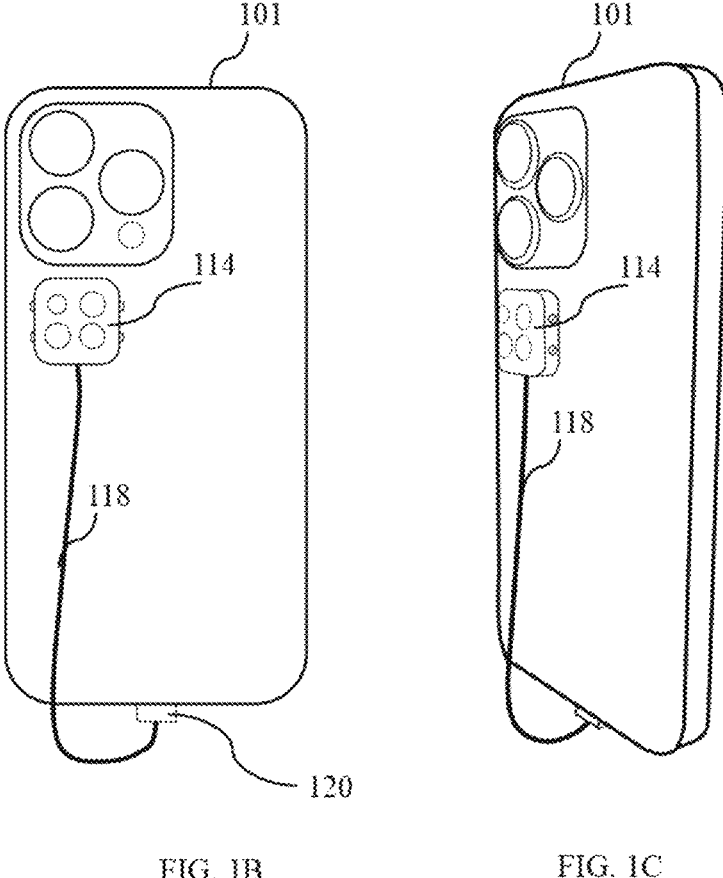
FIG. 1B                    FIG. 1C

200

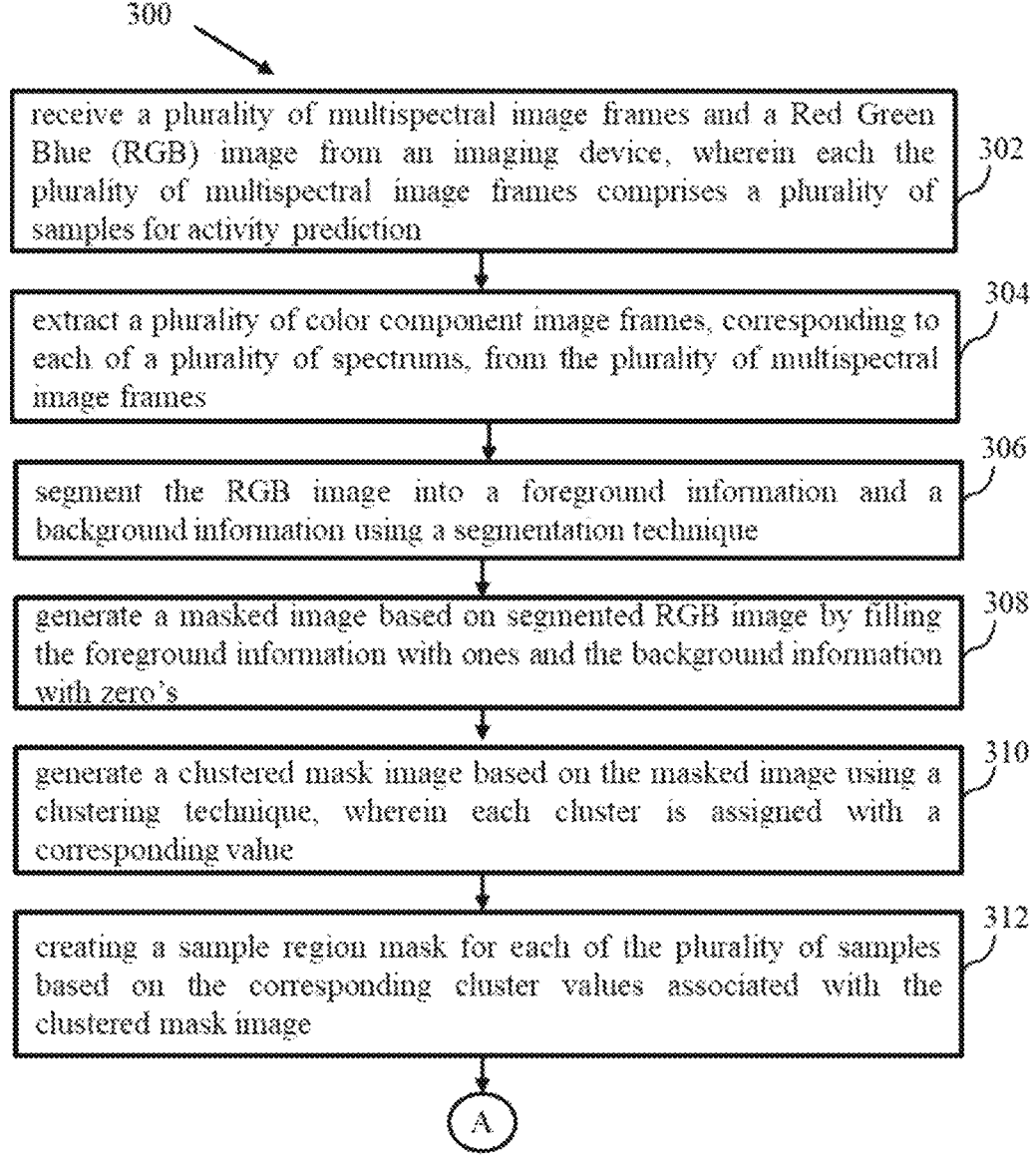

300 receive a plurality of multispectral image frames and a Red Green Blue (RGB) image from an imaging device, wherein each the plurality of multispectral image frames comprises a plurality of samples for activity prediction — 302 extract a plurality of color component image frames, corresponding to each of a plurality of spectrums, from the plurality of multispectral image frames — 304 segment the RGB image into a foreground information and a background information using a segmentation technique — 306 generate a masked image based on segmented RGB image by filling the foreground information with ones and the background information with zero's — 308 generate a clustered mask image based on the masked image using a clustering technique, wherein each cluster is assigned with a corresponding value — 310 creating a sample region mask for each of the plurality of samples based on the corresponding cluster values associated with the clustered mask image — 312

(A)

314 simultaneously generating, a color coded activity map associated with each of the plurality of spectrums based on the plurality of corresponding color component image frames using a color coded activity map generation technique

316 compute a cluster contrast value for each of the plurality of samples corresponding to each of the plurality of spectrums by multiplying the sample region mask associated with each of the plurality of samples with the color coded activity map corresponding to each of the plurality of spectrums

318 select a plurality of optimal color coded regions of interest from the plurality of color coded activity maps based on the plurality of cluster contrast values corresponding to each spectrum, wherein a color coded region of interest with a cluster contrast value greater than among the plurality of cluster contrast values associated with each spectrum is selected as optimal color coded regions of interest

320 generate, an activity map by combining the plurality of optimal color coded regions of interest to predict the activity associated with the plurality of samples by eliminating color bias

FIG. 3B

ACTIVITY PREDICTION USING PORTABLE MULTISPECTRAL LASER SPECKLE IMAGER

PRIORITY CLAIM

This U.S. patent application claims priority under 35 U.S.C. § 119 to: Indian Patent Application No. 202321006332, filed on Jan. 31, 2023. The entire contents of the aforementioned application are incorporated herein by reference.

TECHNICAL FIELD

The disclosure herein generally relates to the field of image processing and, more particularly, to a method and system for activity prediction using portable multispectral laser speckle imager.

BACKGROUND

Laser speckle analysis is a non-contact technique widely used in applications such as seed quality analysis, detection of fungal infections in fresh products, estimation of blood flow velocities, assessments of the growth of plant roots, drying of paints and functional coatings and the like. The laser speckle analysis techniques analyses images captured in Laser speckle imaging (LSI) imaging modality. Multi-spectral imaging techniques captures image data within specific wavelength ranges across the electromagnetic spectrum. The simplicity and unobtrusiveness of this technique make it ideal for many real-world applications.

However, lasers are more sensitive to the color of the samples. For example, a brown gram is more responsive to red spectrum of the laser and therefore produces a higher contrast image in red spectrum than green and blue. Thus, with multispectral imaging color biasing of samples could be eliminated efficiently. Some conventional methods utilize single wavelength-swept laser with range less than 150 nm which does not provide accurate results. Some other conventional methods utilize laser spot imaging, and the scan area is limited. Further, the conventional methods are mainly focusing on health care domain and fails to address similar problems in other domains like seed quality analysis, detection of fungal infections and the like. Furthermore, most of the conventional methods fails to address color bias in images which is a major concern in terms of accuracy in applications like activity prediction.

SUMMARY

Embodiments of the present disclosure present techno-logical improvements as solutions to one or more of the above-mentioned technical problems recognized by the inventors in conventional systems. For example, in one embodiment, a method for activity prediction using portable multispectral laser speckle imager. The method includes receiving, by one or more hardware processors, a plurality of multispectral image frames and a Red Green Blue (RGB) image from an imaging device, wherein each the plurality of multispectral image frames comprises a plurality of samples for activity prediction. Further, the method includes extracting by the one or more hardware processors, a plurality of color component image frames, corresponding to each of a plurality of spectrums, from the plurality of multispectral image frames. Furthermore, the method includes segment-ing by the one or more hardware processors, the RGB image into a foreground information and a background information using a segmentation technique. Furthermore, the method includes generating, by the one or more hardware proces-sors, a masked image based on segmented RGB image by filling the foreground information with ones and the back-ground information with zero's. Furthermore, the method includes generating, by the one or more hardware proces-sors, a clustered mask image based on the masked image using a clustering technique, wherein each cluster is assigned with a corresponding value. Furthermore, the method includes creating, by the one or more hardware processors, a sample region mask for each of the plurality of samples based on the corresponding cluster values associ-ated with the clustered mask image. Furthermore, the method includes simultaneously generating, by the one or more hardware processors, a color coded activity map associated with each of the plurality of spectrums based on the plurality of corresponding color component image frames using a color coded activity map generation tech-nique. Furthermore, the method includes computing, by the one or more hardware processors, a cluster contrast value for each of the plurality of samples corresponding to each of the plurality of spectrums by multiplying the sample region mask associated with each of the plurality of samples with the color coded activity map corresponding to each of the plurality of spectrums. Furthermore, the method includes selecting, by the one or more hardware processors, a plu-rality of optimal color coded regions of interest from the plurality of color coded activity maps based on the plurality of cluster contrast values corresponding to each spectrum, wherein a color coded region of interest with a cluster contrast value greater than among the plurality of cluster contrast values associated with each spectrum is selected as optimal color coded regions of interest. Finally, the method includes generating, by the one or more hardware proces-sors, an activity map by combining the plurality of optimal color coded regions of interest to predict the activity asso-ciated with the plurality of samples by eliminating color bias.

In another aspect, a system for activity prediction using portable multispectral laser speckle imager. The system includes a portable multispectral laser speckle imager opera-tively coupled to the computing device, wherein the portable multispectral laser speckle imager comprising a microcon-troller, a transistor and a plurality of light sources, wherein the computing device comprising at least one memory storing programmed instructions; one or more Input/Output (I/O) interfaces; and one or more hardware processors operatively coupled to the at least one memory, wherein the one or more hardware processors are configured by the programmed instructions to receive a plurality of multispec-tral image frames and a Red Green Blue (RGB) image from an imaging device, wherein each the plurality of multispec-tral image frames comprises a plurality of samples for activity prediction. Further, the one or more hardware pro-cessors are configured by the programmed instructions to extract a plurality of color component image frames, corre-sponding to each of a plurality of spectrums, from the plurality of multispectral image frames. Furthermore, the one or more hardware processors are configured by the programmed instructions to segment the RGB image into a foreground information and a background information using a segmentation technique. Furthermore, the one or more hardware processors are configured by the programmed instructions to generate a masked image based on segmented RGB image by filling the foreground information with ones and the background information with zero's. Furthermore, the one or more hardware processors are configured by the programmed instructions to generate a clustered mask image based on the masked image using a clustering technique, wherein each cluster is assigned with a corresponding value. Furthermore, the one or more hardware processors are configured by the programmed instructions to create a sample region mask for each of the plurality of samples based on the corresponding cluster values associated with the clustered mask image. Furthermore, the one or more hardware processors are configured by the programmed instructions to simultaneously generate a color coded activity map associated with each of the plurality of spectrums based on the plurality of corresponding color component image frames using a color coded activity map generation technique. Furthermore, the one or more hardware processors are configured by the programmed instructions to compute a cluster contrast value for each of the plurality of samples corresponding to each of the plurality of spectrums by multiplying the sample region mask associated with each of the plurality of samples with the color coded activity map corresponding to each of the plurality of spectrums. Furthermore, the one or more hardware processors are configured by the programmed instructions to select a plurality of optimal color coded regions of interest from the plurality of color coded activity maps based on the plurality of cluster contrast values corresponding to each spectrum, wherein a color coded region of interest with a cluster contrast value greater than among the plurality of cluster contrast values associated with each spectrum is selected as optimal color coded regions of interest. Finally, the one or more hardware processors are configured by the programmed instructions to generate an activity map by combining the plurality of optimal color coded regions of interest to predict the activity associated with the plurality of samples by eliminating color bias.

In yet another aspect, a computer program product including a non-transitory computer-readable medium having embodied therein a computer program for activity prediction using portable multispectral laser speckle imager. The computer readable program, when executed on a computing device, causes the computing device to receive a plurality of multispectral image frames and a Red Green Blue (RGB) image from an imaging device, wherein each the plurality of multispectral image frames comprises a plurality of samples for activity prediction. Further, the computer readable program, when executed on a computing device, causes the computing device to extract a plurality of color component image frames, corresponding to each of a plurality of spectrums, from the plurality of multispectral image frames. Furthermore, the computer readable program, when executed on a computing device, causes the computing device to segment the RGB image into a foreground information and a background information using a segmentation technique. Furthermore, the computer readable program, when executed on a computing device, causes the computing device to generate a masked image based on segmented RGB image by filling the foreground information with ones and the background information with zero's. Furthermore, the computer readable program, when executed on a computing device, causes the computing device to generate a clustered mask image based on the masked image using a clustering technique, wherein each cluster is assigned with a corresponding value. Furthermore, the computer readable program, when executed on a computing device, causes the computing device to create a sample region mask for each of the plurality of samples based on the corresponding cluster values associated with the clustered mask image. Furthermore, the computer readable program, when executed on a computing device, causes the computing device to simultaneously generate a color coded activity map associated with each of the plurality of spectrums based on the plurality of corresponding color component image frames using a color coded activity map generation technique. Furthermore, the computer readable program, when executed on a computing device, causes the computing device to compute a cluster contrast value for each of the plurality of samples corresponding to each of the plurality of spectrums by multiplying the sample region mask associated with each of the plurality of samples with the color coded activity map corresponding to each of the plurality of spectrums. Furthermore, the computer readable program, when executed on a computing device, causes the computing device to select a plurality of optimal color coded regions of interest from the plurality of color coded activity maps based on the plurality of cluster contrast values corresponding to each spectrum, wherein a color coded region of interest with a cluster contrast value greater than among the plurality of cluster contrast values associated with each spectrum is selected as optimal color coded regions of interest. Finally, the computer readable program, when executed on a computing device, causes the computing device to generate an activity map by combining the plurality of optimal color coded regions of interest to predict the activity associated with the plurality of samples by eliminating color bias.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 1B and 1C are exemplary block diagrams of the system shown in FIG. 1A for activity prediction using portable multispectral laser speckle imager, in accordance with some embodiments of the present disclosure.

FIGS. 3A and 3B (collectively called as FIG. 3) depict an exemplary flow diagram illustrating a processor implemented method 300 for activity prediction using portable multispectral laser speckle imager implemented by the system of FIG. 1A according to some embodiments of the present disclosure.

DETAILED DESCRIPTION

Figure 1A:
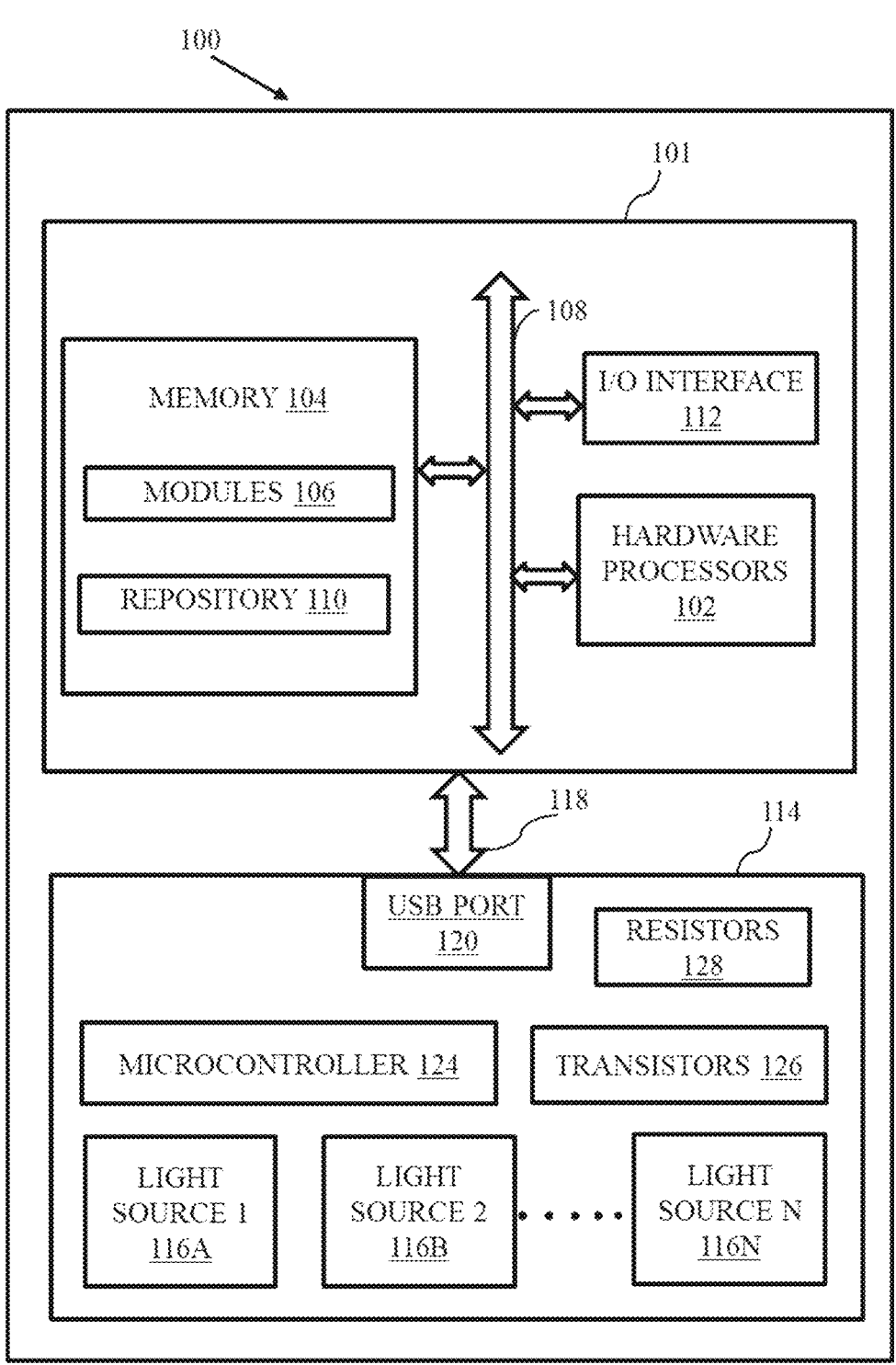
FIG. 1A is a functional block diagram of a system for activity prediction using portable multispectral laser speckle imager, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Multispectral laser speckle analysis techniques have been widely used for applications such as the analysis of seed qualities, detection of fungal infections in fresh produce, estimation of blood flow velocities, assessments of the growth of plant roots, drying of paints and functional coatings and the like. The simplicity and unobtrusiveness of this technique make it ideal for many real-world applications. However, Lasers are more sensitive to the color of the samples. For example, a brown gram is more responsive to red spectrum of the laser and therefore produces a higher contrast image in red spectrum than green and blue. Thus, with multispectral imaging color biasing of samples could be eliminated efficiently. However, the conventional methods fail to address color bias in images which is a major concern in terms of accuracy in applications like activity prediction.

To overcome the challenges in the conventional approaches, the present disclosure provides a portable multispectral laser imager that combines laser speckle imaging with conventional RGB imaging and employs a custom image processing algorithm which performs activity prediction without any color bias. Here, an RGB input image is segmented, and mask is generated. Distance based clustering is performed on the masked image to obtain cluster map. Simultaneously color coded activity map is generated for each red, green and blue component of a multispectral image. Further, the color coded activity map is multiplied with a sample region mask to obtain activity information. Due to the multiplication of color coded activity map with the sample region mask and thereby selecting an optimal color coded region of interest, color bias is eliminated in activity map generation.

Referring now to the drawings, and more particularly to FIGS. 1A through 4H, where similar reference characters denote corresponding features consistently throughout the figures, there are shown preferred embodiments and these embodiments are described in the context of the following exemplary system and/or method.

FIG. 1A is a functional block diagram of a system 100 for activity prediction using portable multispectral laser speckle imager, in accordance with some embodiments of the present disclosure. The system 100 includes a portable multispectral laser speckle imager 114 operatively coupled to a computing device 101 via an interface 118. In an embodiment, the interface 118 is a Universal Serial Bus (USB) data bus. The portable multispectral laser speckle imager 114 includes a USB port 120, a microcontroller 124, a plurality of transistors 126, a plurality if resistors 128 and a plurality of light sources 116A through 116N. In an embodiment, the plurality of light sources 116A through 116N includes three laser diodes of wavelengths in red, green and blue spectrum. The light emitting from the diodes have divergent beams which can be achieved by removing the cylindrical lens in-front of commercially available laser diodes. Else in addition optical lens setup with micro objective can be introduced. Fourth light source is a Light Emitting Diode (LED) flash to capture RGB image. The plurality of resistors 128 is turned to control the intensity of individual light sources. The USB port 120 is connected to the USB port of the computing device 101. The portable multispectral laser speckle imager 114 is powered from the USB port of the computing device 101.

The computing device (101) includes or is in communication with a plurality of hardware processors 102, at least one memory such as a memory 104, and an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors. In an embodiment, the computing device 101 can be a desktop, laptop, mobile devices, gadgets and the like.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

Figure 2:
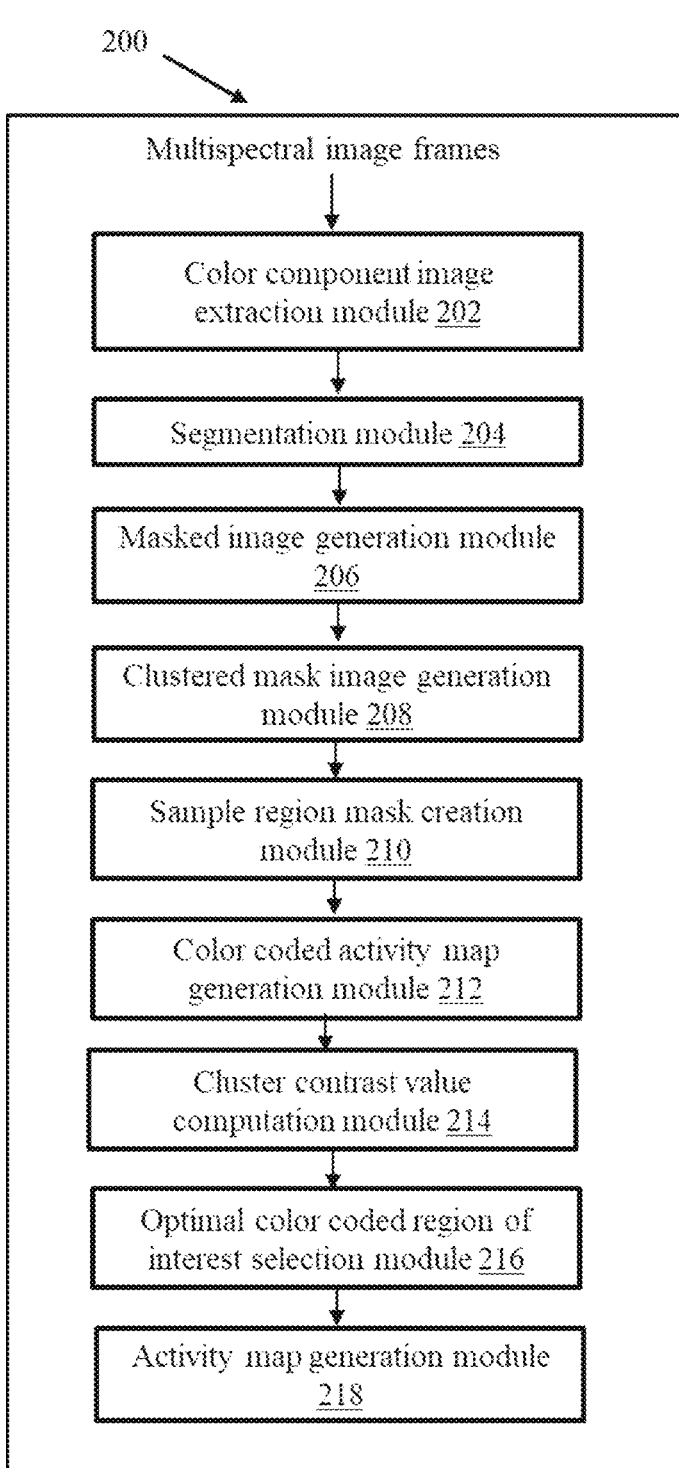
FIG. 2 illustrates a functional architecture of the system of FIG. 1A, for activity prediction using portable multispectral laser speckle imager, in accordance with some embodiments of the present disclosure.

The plurality of modules 106 include programs or coded instructions that supplement applications or functions performed by the system 100 for activity prediction using portable multispectral laser speckle imager. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the Creating dynamic image hotspots. In an embodiment, the modules 106 includes color component image extraction module (shown in FIG. 2), a segmentation module (shown in FIG. 2), a masked image generation module (shown in FIG. 2), a clustered mask image generation module (shown in FIG. 2), the sample region mask creation module (shown in FIG. 2), a color coded activity map generation module (shown in FIG. 2), cluster contrast value computation module (shown in FIG. 2), optimal color coded regions of interest selection module (shown in FIG. 2) and an activity map generation module (shown in FIG. 2). In an embodiment, FIG. 2 illustrates a functional architecture of the system of FIG. 1A, for activity prediction using portable multispectral laser speckle imager, in accordance with some embodiments of the present disclosure.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1A) and/or existing data may be modified and/or non-useful data may be deleted from the database. In one example, the data may be stored in an external system, such as a Lightweight Directory Access Protocol (LDAP) directory and a Relational Database Management System (RDBMS). Working of the components of the system 100 are explained with reference to the method steps depicted in FIG. 3.

FIGS. 1B and 1C are exemplary block diagrams of the system shown in FIG. 1A for activity prediction using portable multispectral laser speckle imager, in accordance with some embodiments of the present disclosure. FIG. 1B is the front view of the portable multispectral laser speckle imager 114 attached to a device such as mobile device and the FIG. 1C is the orthogonal view.

Figure 1D:
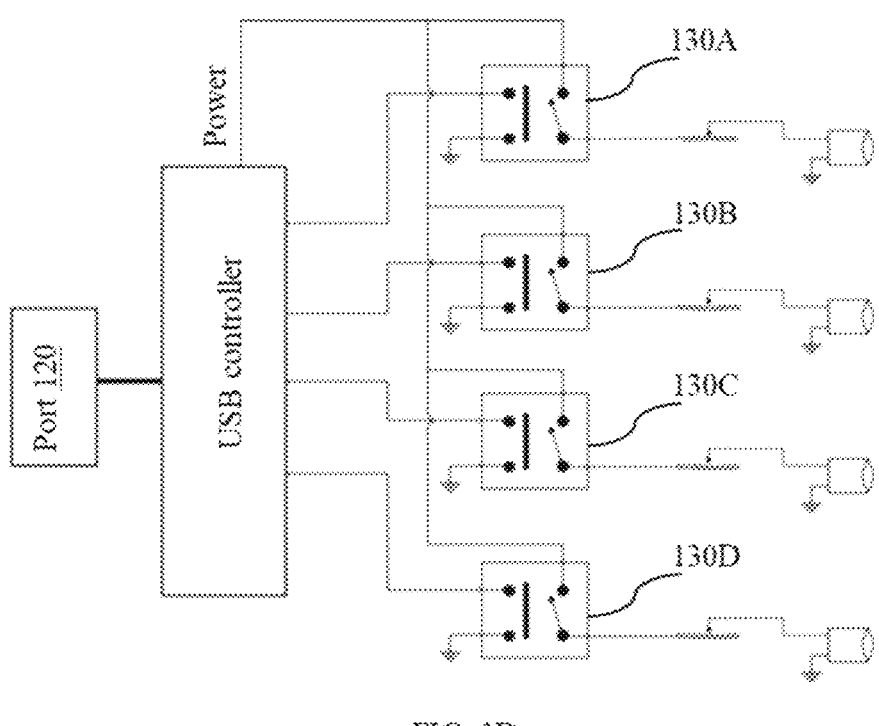
FIG. 1D is an exemplary circuit diagram of a portable multispectral laser speckle imager system shown in FIG. 1A, in accordance with some embodiments of the present disclosure.

FIG. 1D is an exemplary circuit diagram of a portable multispectral laser speckle imager system shown in FIG. 1A, in accordance with some embodiments of the present disclosure. Now referring to FIG. 1D, the USB port is connected to a USB controller which continuously read input byte stream of data through the USB Communication Device Class (CDC) communication protocol. The USB controller check for valid 1 byte commands received from the computing device 101. Based on the valid commands the respective transistor/switch turns ON/OFF. The four switches (130A through 130D) control the power line for light sources. Based on application the three laser sources and led sources can be powered in any sequence possible. The computing device 101 includes at least one camera/imaging device such as the mobile device depicted in FIGS. 1B and 1C. In another embodiment, respective image sequence of the sample can also be captured using the camera/imaging device of the computing device 101.

FIG. 3 is an exemplary flow diagram illustrating a method 300 for activity prediction using portable multispectral laser speckle imager implemented by the system of FIG. 1A according to some embodiments of the present disclosure. In an embodiment, the system 100 includes one or more data storage devices or the memory 104 operatively coupled to the one or more hardware processor(s) 102 and is configured to store instructions for execution of steps of the method 300 by the one or more hardware processors 102. The steps of the method 300 of the present disclosure will now be explained with reference to the components or blocks of the system 100 as depicted in FIG. 1A and the steps of flow diagram as depicted in FIG. 3. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof.

At step 302 of the method 300, the one or more hardware processors 102 of the computing device 101 are configured by the programmed instructions to receive a plurality of multispectral image frames and a Red Green Blue (RGB) image from an imaging device. Each the plurality of multispectral image frames comprises a plurality of samples for activity prediction. The plurality of multispectral image frames are captured by illuminating red, blue and green lasers of the imaging device, wherein the RGB image is captured by illuminating Light Emitting Diode (LED) flash of the imaging device. In an embodiment, the imaging device is the portable multispectral imager shown in FIG. 1A through FIG. 1C.

Figure 4A:
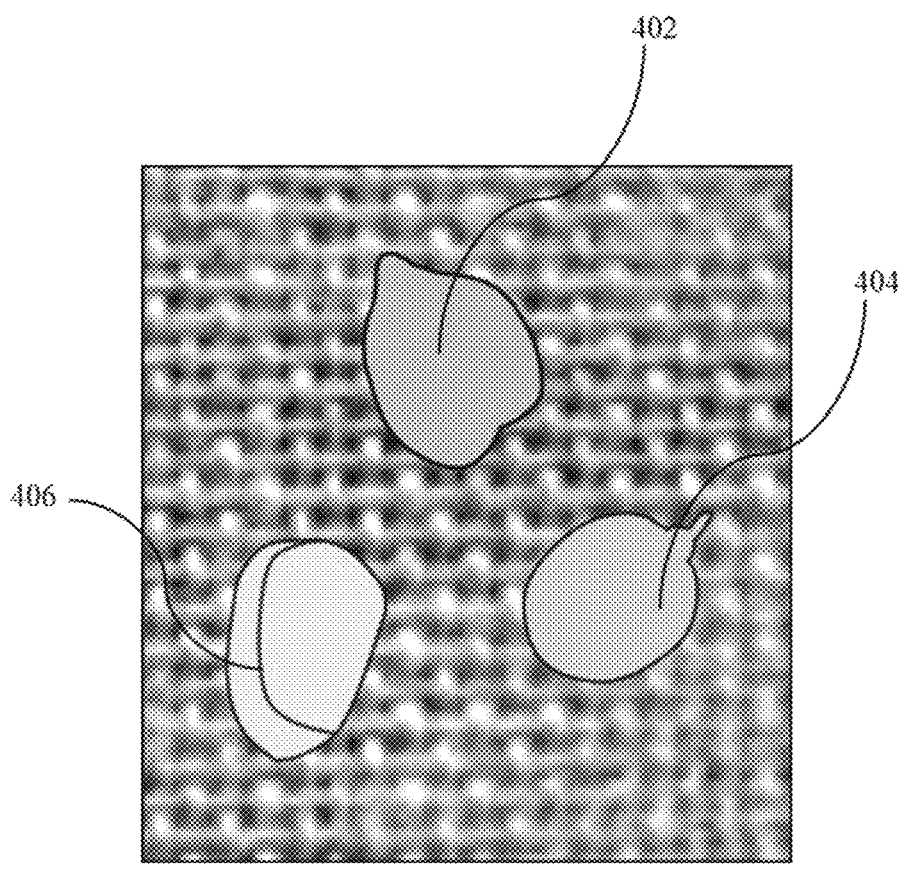
FIG. 4A is an example input image for the processor implemented method for activity prediction using portable multispectral laser speckle imager implemented by the system of FIG. 1A according to some embodiments of the present disclosure.

FIG. 4A is an example input image for the processor implemented method for activity prediction using portable multispectral laser speckle imager implemented by the system of FIG. 1A according to some embodiments of the present disclosure. Now referring to FIG. 4A, 402 is an image of a Bengal gram or brown gram, 404 is an image of a green pea, 406 is the image of a blue corn.

At step 304 of the method 300, the color component image extraction module 202 executed by one or more hardware processors 102 is configured by the programmed instructions to extract a plurality of color component image frames corresponding to each of a plurality of spectrums from the plurality of multispectral image frames. In an embodiment, the plurality of spectrum includes a red spectrum, a green spectrum, and a blue spectrum. A plurality of red color component images frames are extracted from a plurality of multispectral image frames associated with the red spectrum. A plurality of green color component images frames are extracted from a plurality of multispectral image frames associated with the green spectrum. The plurality of blue color component images frames are extracted from a plurality of multispectral image frames associated with the blue spectrum.

Figure 4B:
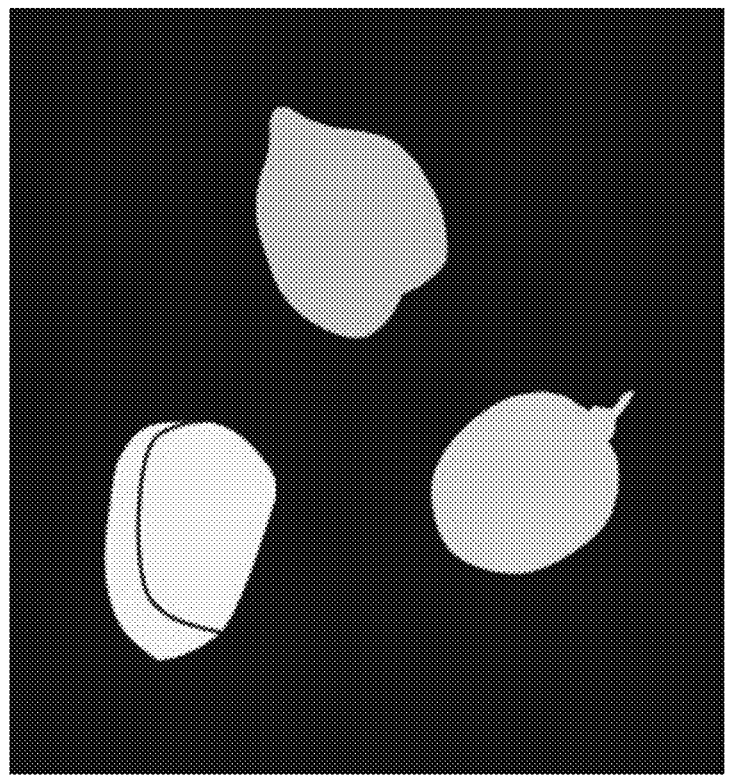
FIG. 4B is an example segmented image of the input image shown in FIG. 4A, for the processor implemented method for activity prediction using portable multispectral laser speckle imager implemented by the system of FIG. 1A according to some embodiments of the present disclosure.

At step 306 of the method 300, the segmentation module 204 executed by the one or more hardware processors 102 is configured by the programmed instructions to segment the RGB image into a foreground information and a background information using a segmentation technique. FIG. 4B illustrates an example segmented image of the input image shown in FIG. 4A, for the processor implemented method for activity prediction using portable multispectral laser speckle imager implemented by the system of FIG. 1A according to some embodiments of the present disclosure.

Figure 4C:
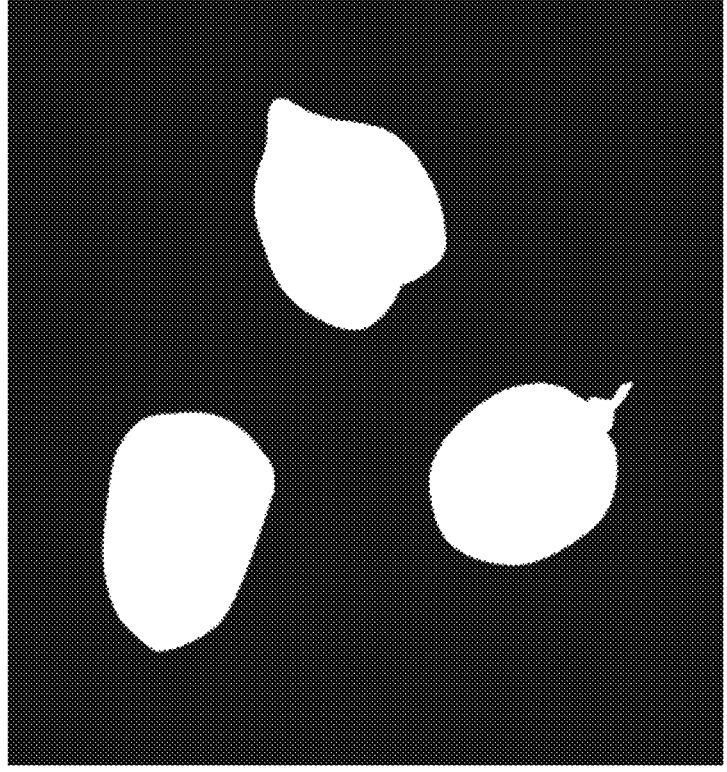
FIG. 4C is an example masked image of the segmented image shown in FIG. 4B, for the processor implemented method for activity prediction using portable multispectral laser speckle imager implemented by the system of FIG. 1A according to some embodiments of the present disclosure.

At step 308 of the method 300, the masked image generation module 206 executed by the one or more hardware processors 102 is configured by the programmed instructions to generate a masked image based on segmented RGB image by filling the foreground information with ones and the background information with zero's. FIG. 4C illustrates masked output of the input image shown in FIG. 4A, for the processor implemented method for activity prediction using portable multispectral laser speckle imager implemented by the system of FIG. 1A according to some embodiments of the present disclosure.

At step 310 of the method 300, the clustered mask image generation module 208 executed by the one or more hardware processors 102 is configured by the programmed instructions to generate a clustered mask image based on the masked image using a clustering technique, wherein each cluster is assigned with a corresponding value. The clustering technique is a distance based clustering technique such as Density Based Spatial Clustering of Applications with Noise (DBSCAN). For example, the ones which are nearer are clustered together.

Figure 4D:
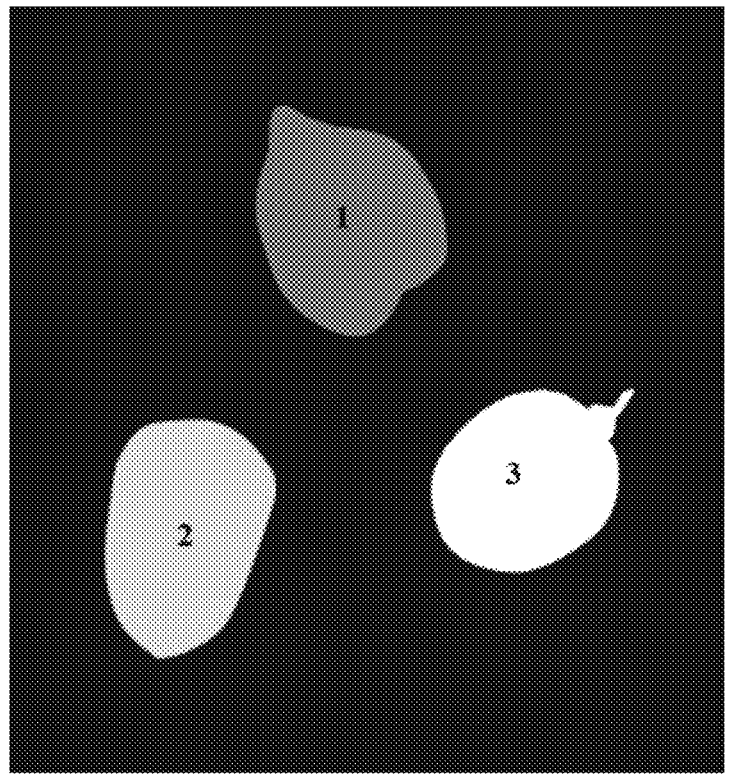
FIG. 4D is an example clustered masked image of the segmented image shown in FIG. 4C, for the processor implemented method for activity prediction using portable multispectral laser speckle imager implemented by the system of FIG. 1A according to some embodiments of the present disclosure.

FIG. 4D is an example clustered masked image of the segmented image shown in FIG. 4C, for the processor implemented method for activity prediction using portable multispectral laser speckle imager implemented by the system of FIG. 1A according to some embodiments of the present disclosure. Individual clusters are assigned with different values. However, each cluster will have same value. For example, background values=0, Bengal gram cluster values=1, blue corn cluster values=2, green pea cluster values=3 etc.

At step 312 of the method 300, the sample region mask generation module 210 executed by the one or more hardware processors 102 is configured by the programmed instructions to create a sample region mask for each of the plurality of samples based on the corresponding cluster values associated with the clustered mask image. For example, a sample region mask is created for Bengal gram based on the cluster value 1. Similarly, a sample region mask is created for the green gram and blue corn based on the corresponding cluster values 2 and 3.

At step 314 of the method 300, the color coded activity map generation module 212 executed by the one or more hardware processors 102 is configured by the programmed instructions to simultaneously generate a color coded activity map corresponding to each of the plurality of spectrums based on the plurality of corresponding color component image frames using a color coded activity map generation technique.

Figure 4E:
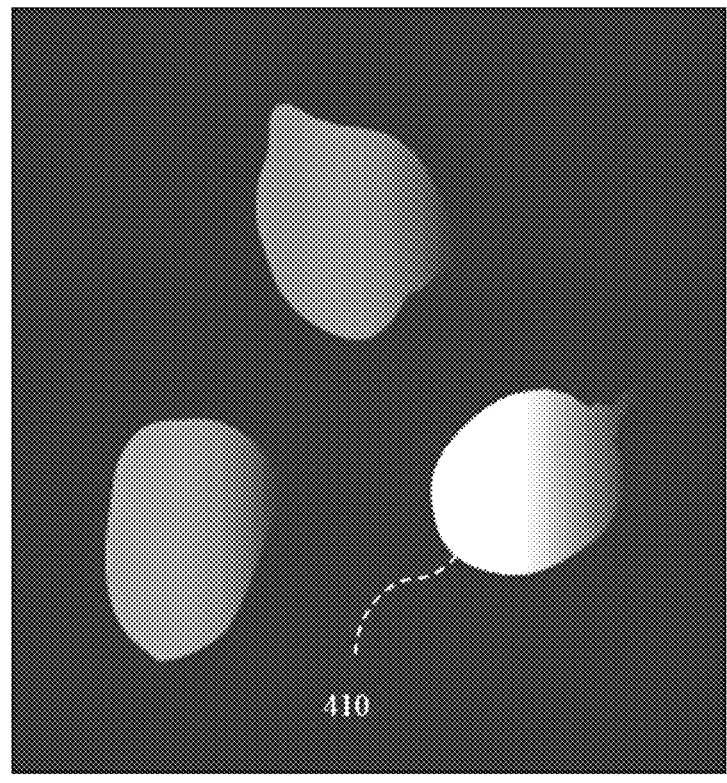
FIG. 4E is an example green spectrum activity map, for the processor implemented method for activity prediction using portable multispectral laser speckle imager implemented by the system of FIG. 1A according to some embodiments of the present disclosure.

FIG. 4E is an example green spectrum activity map, for the processor implemented method for activity prediction using portable multispectral laser speckle imager implemented by the system of FIG. 1A according to some embodiments of the present disclosure. Now referring to FIG. 4E, green pea contrast 410 is higher than other two seeds. Generally, contrast is calculated for any image by dividing the standard deviation of image with mean of the same image. Hence, contrast values range from 0 to 1.

Figure 4F:
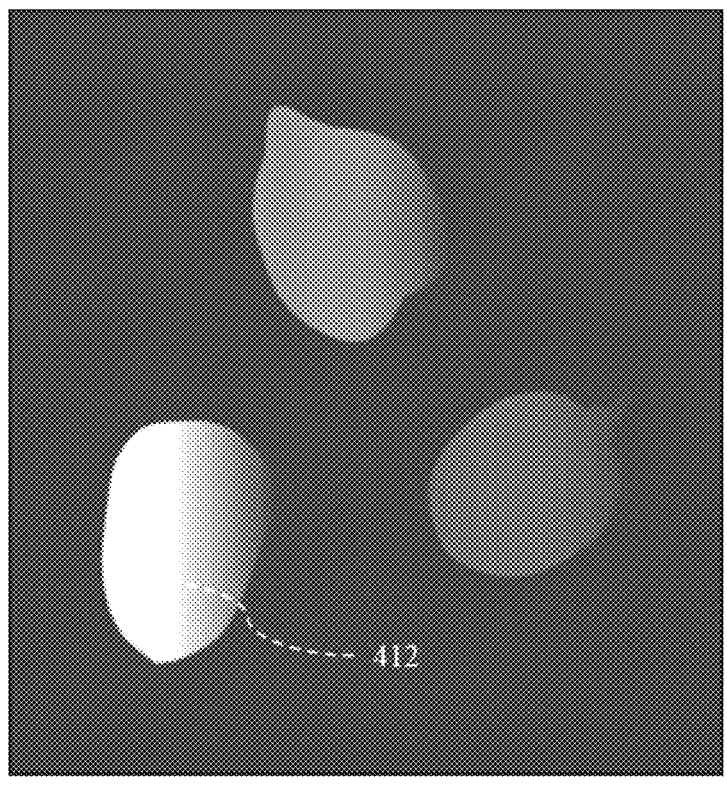
FIG. 4F is an example blue spectrum activity map, for the processor implemented method for activity prediction using portable multispectral laser speckle imager implemented by the system of FIG. 1A according to some embodiments of the present disclosure.

FIG. 4F is an example blue spectrum activity map, for the processor implemented method for activity prediction using portable multispectral laser speckle imager implemented by the system of FIG. 1A according to some embodiments of the present disclosure. Now referring to FIG. 4E, blue corn's contrast 412 is higher than other two seeds.

Figure 4G:
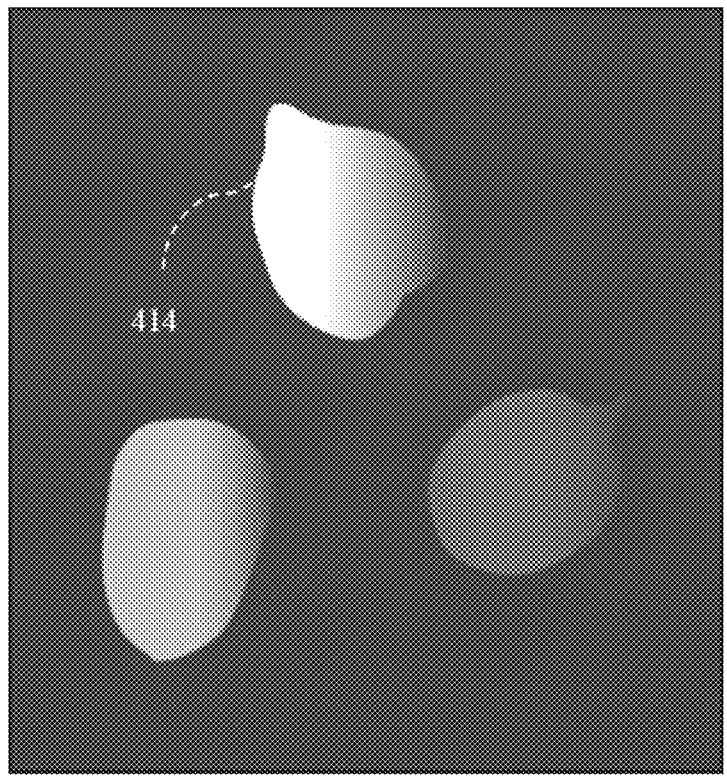
FIG. 4G is an example red spectrum activity map, for the processor implemented method for activity prediction using portable multispectral laser speckle imager implemented by the system of FIG. 1A according to some embodiments of the present disclosure.

FIG. 4G is an example red spectrum activity map, for the processor implemented method for activity prediction using portable multispectral laser speckle imager implemented by the system of FIG. 1A according to some embodiments of the present disclosure. Now referring to FIG. 4E, blue corn's contrast 414 is higher than other two seeds.

At step 316 of the method 300, the cluster contrast value computation module 214 executed by the one or more hardware processors 102 is configured by the programmed instructions to. compute a cluster contrast value for each of the plurality of samples corresponding to each of the plurality of spectrums by multiplying the sample region mask associated with each of the plurality of samples with the color coded activity map corresponding to each of the plurality of spectrums.

At step 318 of the method 300, the optimal color coded regions of interest selection module 216 executed by the one or more hardware processors 102 is configured by the programmed instructions to select a plurality of optimal color coded regions of interest from the plurality of color coded activity maps based on the plurality of cluster contrast values corresponding to each spectrum. For example, a color coded region of interest with a cluster contrast value greater than among the plurality of cluster contrast values associated with each spectrum is selected as optimal color coded regions of interest.

Figure 4H:
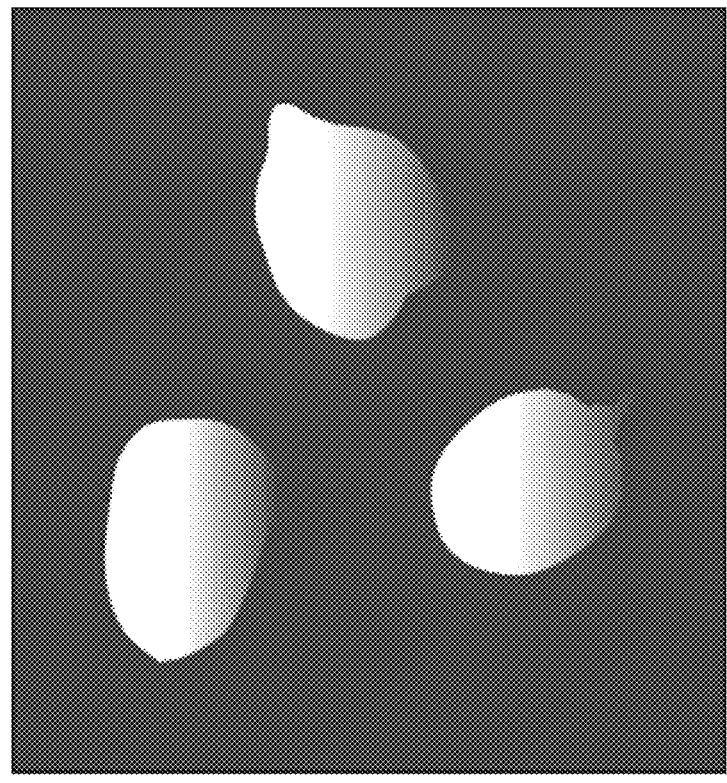
FIG. 4H is an example activity map, for the processor implemented method for activity prediction using portable multispectral laser speckle imager implemented by the system of FIG. 1A according to some embodiments of the present disclosure.

At step 320 of the method 300, the activity map generation module 218 executed by the one or more hardware processors 102 is configured by the programmed instructions to generate an activity map by combining the plurality of optimal color coded regions of interest FIG. 4H is an example activity map, for the processor implemented method for activity prediction using portable multispectral laser speckle imager implemented by the system of FIG. 1A according to some embodiments of the present disclosure. The activity map is interpreted to predict an activity associated with the plurality of samples. For example, considering the FIG. H, the activity predicted here is germination capability of seeds. Similarly other activities like drying of paint coating, fungal infections on fruits can also be predicted using appropriates image samples using the present disclosure.

Experimentation Details

In an embodiment, the present disclosure is experimented as follows. For the experiment, viable and non-viable group of brown gram, blue corn and green peas seeds were collected. The collected seeds were soaked in water for 4 hours at room temperature. Based on experimentation using the present disclosure, viable seeds showed high level of activity compared non-viable seeds.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of color bias-less activity prediction from multispectral image frames. The color bias is removed due to the multiplication of color coded activity map with the cluster contrast value and thereby selecting optimal regions of interest based on contrast levels within each clusters across the spectrum, eliminates color bias in activity prediction.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor (s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:

receiving, by one or more hardware processors, a plurality of multispectral image frames and a Red Green Blue (RGB) image from an imaging device, wherein each the plurality of multispectral image frames comprises a plurality of samples for activity prediction;

extracting, by the one or more hardware processors, a plurality of color component image frames, corresponding to each of a plurality of spectrums, from the plurality of multispectral image frames;

segmenting, by the one or more hardware processors, the RGB image into a foreground information and a background information using a segmentation technique;

generating, by the one or more hardware processors, a masked image based on the segmented RGB image by filling the foreground information with ones and the background information with zeros;

generating, by the one or more hardware processors, a clustered mask image based on the masked image using a clustering technique, wherein each cluster is assigned with a corresponding value;

creating, by the one or more hardware processors, a sample region mask for each of the plurality of samples based on the corresponding cluster values associated with the clustered mask image;

simultaneously generating, by the one or more hardware processors, a color coded activity map associated with each of the plurality of spectrums, based on the plurality of corresponding color component image frames using a color coded activity map generation technique, when creating the sample region mask;

computing, by the one or more hardware processors, a cluster contrast value for each of the plurality of samples corresponding to each of the plurality of spectrums by multiplying the sample region mask associated with each of the plurality of samples with the color coded activity map corresponding to each of the plurality of spectrums;

selecting, by the one or more hardware processors, a plurality of optimal color coded regions of interest from the plurality of color coded activity maps based on the plurality of cluster contrast values corresponding to each spectrum, wherein a color coded region of interest with a cluster contrast value greater than among the plurality of cluster contrast values associated with each spectrum is selected as one of the plurality of optimal color coded regions of interest; and generating, by the one or more hardware processors, an activity map by combining the plurality of optimal color coded regions of interest, wherein the activity map predicts the activity associated with the plurality of samples.

2. The processor implemented method of claim 1, wherein the imaging device is a multispectral laser speckle imager further comprising a plurality of light sources.

3. The processor implemented method of claim 1, wherein the clustering technique is a distance based clustering technique.

4. The processor implemented method of claim 1, wherein the plurality of multispectral image frames are captured by illuminating red, blue and green lasers of the imaging device, wherein the RGB image is captured by illuminating Light Emitting Diode (LED) flash of the imaging device.

5. The processor implemented method of claim 1, wherein a plurality of red color component images frames are extracted from a plurality of multispectral image frames associated with a red spectrum, wherein a plurality of green color component images frames are extracted from a plurality of multispectral image frames associated with a green spectrum, and wherein a plurality of blue color component images frames are extracted from a plurality of multispectral image frames associated with a blue spectrum.

6. A system comprising:

a portable multispectral laser speckle imager operatively coupled to a computing device, wherein the portable multispectral laser speckle imager further comprising a microcontroller, a transistor and a plurality of light sources, wherein the computing device comprising at least one memory storing programmed instructions; one or more Input/Output (I/O) interfaces; and one or more hardware processors operatively coupled to the at least one memory, wherein the one or more hardware processors are configured by the programmed instructions to:

receive a plurality of multispectral image frames and a Red Green Blue (RGB) image from an imaging device, wherein each the plurality of multispectral image frames comprises a plurality of samples for activity prediction;

extract a plurality of color component image frames, corresponding to each of a plurality of spectrums, from the plurality of multispectral image frames;

segment the RGB image into a foreground information and a background information using a segmentation technique;

generate a masked image based on the segmented RGB image by filling the foreground information with ones and the background information with zeros;

generate a clustered mask image based on the masked image using a clustering technique, wherein each cluster is assigned with a corresponding value;

create a sample region mask for each of the plurality of samples based on the corresponding cluster values associated with the clustered mask image;

simultaneously generate a color coded activity map associated with each of the plurality of spectrums, based on the plurality of corresponding color component image frames using a color coded activity map generation technique, when creating the sample region mask;

compute a cluster contrast value for each of the plurality of samples corresponding to each of the plurality of spectrums by multiplying the sample region mask associated with each of the plurality of samples with the color coded activity map corresponding to each of the plurality of spectrums;

select a plurality of optimal color coded regions of interest from the plurality of color coded activity maps based on the plurality of cluster contrast values corresponding to each spectrum, wherein a color coded region of interest with a cluster contrast value greater than among the plurality of cluster contrast values associated with each spectrum is selected as one of the plurality of optimal color coded regions of interest; and generate an activity map by combining the plurality of optimal color coded regions of interest, wherein the activity map predicts the activity associated with the plurality of samples.

7. The system of claim 6, wherein the imaging device is a multispectral laser speckle imager further comprising a plurality of light sources.

8. The system of claim 6, wherein the clustering technique is a distance based clustering technique.

9. The system of claim 6, wherein the plurality of multispectral image frames are captured by illuminating red, blue and green lasers of the imaging device, wherein the RGB image is captured by illuminating Light Emitting Diode (LED) flash of the imaging device.

10. The system of claim 6, wherein a plurality of red color component images frames are extracted from a plurality of multispectral image frames associated with a red spectrum, wherein a plurality of green color component images frames are extracted from a plurality of multispectral image frames associated with a green spectrum, and wherein a plurality of blue color component images frames are extracted from a plurality of multispectral image frames associated with a blue spectrum.

11. One or more non-transitory machine-readable information storage mediums comprising one or more instructions which when executed by one or more hardware processors cause:

receiving a plurality of multispectral image frames and a Red Green Blue (RGB) image from an imaging device, wherein each the plurality of multispectral image frames comprises a plurality of samples for activity prediction;

extracting a plurality of color component image frames, corresponding to each of a plurality of spectrums, from the plurality of multispectral image frames;

segmenting the RGB image into a foreground information and a background information using a segmentation technique;

generating a masked image based on the segmented RGB image by filling the foreground information with ones and the background information with zeros;

generating a clustered mask image based on the masked image using a clustering technique, wherein each cluster is assigned with a corresponding value;

creating a sample region mask for each of the plurality of samples based on the corresponding cluster values associated with the clustered mask image;

simultaneously generating a color coded activity map associated with each of the plurality of spectrums, based on the plurality of corresponding color component image frames using a color coded activity map generation technique, when creating the sample region mask;

computing a cluster contrast value for each of the plurality of samples corresponding to each of the plurality of spectrums by multiplying the sample region mask associated with each of the plurality of samples with the color coded activity map corresponding to each of the plurality of spectrums;

selecting a plurality of optimal color coded regions of interest from the plurality of color coded activity maps based on the plurality of cluster contrast values corresponding to each spectrum, wherein a color coded region of interest with a cluster contrast value greater than among the plurality of cluster contrast values associated with each spectrum is selected as one of the plurality of optimal color coded regions of interest; and generating an activity map by combining the plurality of optimal color coded regions of interest, wherein the activity map predicts the activity associated with the plurality of samples.

12. The one or more non-transitory machine-readable information storage mediums of claim 11, wherein the imaging device is a multispectral laser speckle imager further comprising a plurality of light sources.

13. The one or more non-transitory machine-readable information storage mediums of claim 11, wherein the clustering technique is a distance based clustering technique.

14. The one or more non-transitory machine-readable information storage mediums of claim 11, wherein the plurality of multispectral image frames are captured by illuminating red, blue and green lasers of the imaging device, wherein the RGB image is captured by illuminating Light Emitting Diode (LED) flash of the imaging device.

15. The one or more non-transitory machine-readable information storage mediums of claim 11, wherein a plurality of red color component images frames are extracted from a plurality of multispectral image frames associated with a red spectrum, wherein a plurality of green color component images frames are extracted from a plurality of multispectral image frames associated with a green spectrum, and wherein a plurality of blue color component images frames are extracted from a plurality of multispectral image frames associated with a blue spectrum.

* * * * *